(12) United States Patent
Wang et al.

(10) Patent No.: US 11,263,920 B2
(45) Date of Patent: Mar. 1, 2022

(54) DISPLAY PANEL FOR THE BLIND AND DISPLAY DEVICE

(71) Applicants: BOE Technology Group Co., Ltd., Beijing (CN); Beijing BOE Display Technology Co., Ltd., Beijing (CN)

(72) Inventors: Zhidong Wang, Beijing (CN); Yun Qiu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 914 days.

(21) Appl. No.: 16/005,875

(22) Filed: Jun. 12, 2018

(65) Prior Publication Data

US 2019/0057619 A1    Feb. 21, 2019

(30) Foreign Application Priority Data

Aug. 18, 2017    (CN) .......................... 201710713520.0

(51) Int. Cl.
*G09B 21/00*    (2006.01)
*G06F 3/01*    (2006.01)
*G06F 3/041*    (2006.01)

(52) U.S. Cl.
CPC ........... *G09B 21/004* (2013.01); *G06F 3/016* (2013.01); *G06F 3/041* (2013.01)

(58) Field of Classification Search
CPC .. G09B 21/004; G09B 21/003; G09B 21/001; G06F 3/016; G06F 3/017; G08B 6/00; H02N 1/006
See application file for complete search history.

(56) References Cited

U.S. PATENT DOCUMENTS 7,497,687 B2    3/2009    Shin
8,547,341 B2   10/2013    Takashima et al.
(Continued)

FOREIGN PATENT DOCUMENTS

CN         1864121 A    11/2006
CN       101150618 A     3/2008
(Continued)

OTHER PUBLICATIONS

First Office Action, including Search Report, for Chinese Patent Application No. 201710713520.0, dated Feb. 12, 2019, 16 pages.

*Primary Examiner* — Robert J Utama
(74) *Attorney, Agent, or Firm* — Westman, Champlin & Koehler, P.A.

(57) ABSTRACT

A display panel for the blind and a display device are provided in the embodiments of the disclosure. The display panel for the blind includes: a back plate; and a plurality of display units provided on the back plate, each comprising: supports provided on the back plate; and an elastic film layer provided on top of the supports and spaced apart from the back plate; the elastic film layer, the supports and the back plate cooperate with one another to define an accommodation cavity thereamong of a respective one of the plurality of display units, and the respective one of the plurality display units is configured to deform in a condition that it is energized so as to drive the accommodation cavity to change its shape and in turn to squeeze the elastic film layer to project outwards; the display device comprises the display panel for the blind as above and a housing configured to receive the display panel.

17 Claims, 4 Drawing Sheets

(56) References Cited

U.S. PATENT DOCUMENTS

| | | | |
|---|---|---|---|
| 8,633,891 B2 | 1/2014 | Nagai et al. | |
| 9,244,531 B2 | 1/2016 | Takashima et al. | |
| 9,658,694 B2 | 5/2017 | Takashima et al. | |
| 9,880,624 B2 | 1/2018 | Bae et al. | |
| 2004/0175676 A1* | 9/2004 | Yang | G09B 21/001 434/112 |
| 2008/0138774 A1* | 6/2008 | Ahn | G09B 21/004 434/114 |
| 2008/0171308 A1 | 7/2008 | Shin | |
| 2009/0154053 A1* | 6/2009 | Biggs | H01L 41/45 361/272 |
| 2009/0160813 A1 | 6/2009 | Takashima et al. | |
| 2011/0012828 A1 | 1/2011 | Nagai et al. | |
| 2013/0002584 A1* | 1/2013 | Leem | G06F 3/04886 345/173 |
| 2014/0168115 A1 | 6/2014 | Takashima et al. | |
| 2015/0234465 A1 | 8/2015 | Bae et al. | |
| 2016/0091973 A1 | 3/2016 | Takashima et al. | |
| 2016/0154461 A1* | 6/2016 | Kang | H01L 41/047 340/407.2 |
| 2016/0225505 A1 | 8/2016 | Pascall | |

FOREIGN PATENT DOCUMENTS

| | | |
|---|---|---|
| CN | 101464727 A | 6/2009 |
| CN | 101958066 A | 1/2011 |
| CN | 102184662 A | 9/2011 |
| CN | 105930014 A | 9/2016 |
| EP | 2738755 A1 | 6/2014 |
| EP | 2908222 A1 | 8/2015 |

\* cited by examiner

DISPLAY PANEL FOR THE BLIND AND DISPLAY DEVICE

CROSS-REFERENCE TO RELATED DISCLOSURE

The present disclosure claims the benefit of Chinese Patent Application Disclosure No. 201710713520.0 filed on Aug. 18, 2017 in the State Intellectual Property Office of China, the whole disclosure of which is incorporated herein by reference.

BACKGROUND OF THE DISCLOSURE

Field of the Disclosure

Embodiments of the present disclosure relate to the technical field of display, and especially to a display panel for the blind and a display device.

Description of the Related Art

With a development of electronic books and a progress in informatization, both species and quantities of books for the blind which are printed traditionally gradually fail to keep pace with a demand of the blind in reading. In relevant art, a display may only be provided for use of users who have normal human vision, and there is no such a display which is designed to be read by the blind with their respective perception by touch actions.

SUMMARY OF THE DISCLOSURE

The embodiments of the present disclosure have been made to overcome or alleviate at least one aspect of the above mentioned disadvantages and/or shortcomings in the prior art, by providing a display panel for the blind and a display device.

Following technical solutions are adopted in exemplary embodiments of the disclosure for achieving the above desired technical purposes.

According to an aspect of the exemplary embodiment of the present disclosure, there is provided a display panel for the blind, comprising a back plate and a plurality of display units provided on the back plate, each of the plurality of display units comprising supports provided on the back plate and an elastic film layer provided on top of the supports and spaced apart from the back plate; the elastic film layer, the supports and the back plate cooperate with one another to define an accommodation cavity thereamong of a respective one of the plurality of display units, and the respective one of the plurality display units is configured to deform in a condition that it is energized so as to drive the accommodation cavity to change its shape and in turn to squeeze the elastic film layer to project outwards.

In an embodiment of the disclosure, the accommodation cavity is filled with one of a liquid material and a gas material.

In an embodiment of the disclosure, the supports comprise: respective supporting bodies; and at least one pair of positive and negative electrode plates, the positive and negative electrode plates of each pair of the at least one pair being located opposite to each other, and each electrode plate of the at least one pair of positive and negative electrode plates being fixed on respective one of the supporting bodies and connected with respective power supply electrode, respectively.

In an embodiment of the disclosure, the supports comprise: respective supporting bodies; and at least one pair of electromagnet pieces of opposite N and S magnetic polarities, the electromagnet pieces of each pair of the at least one pair of electromagnet pieces of opposite N and S magnetic polarities being located opposite to each other, and each electromagnet piece of the at least one pair of electromagnet pieces of opposite N and S magnetic polarities being fixed on respective one of the supporting bodies and connected with respective power supply electrode, respectively.

In an embodiment of the disclosure, electrode plates of an identical electrical polarity are provided respectively on both the elastic film layer and the back plate, the identical electrical polarity being one of positive electric polarity and negative electrical polarity, and the electrode plates being connected with respective power supply electrodes, respectively.

In an embodiment of the disclosure, electromagnet pieces of an identical magnetic polarity are provided respectively on both the elastic film layer and the back plate, the identical magnetic polarity being one of N magnetic polarity and S magnetic polarity, and the electromagnet pieces being connected with respective power supply electrodes, respectively.

In an embodiment of the disclosure, outer surfaces of the at least one pair of positive and negative electrode plates are plated with a dielectric layer.

In an embodiment of the disclosure, the elastic film layer is an elastic membrane formed by a material of polydimethylsiloxane.

In an embodiment of the disclosure, the electrode plates comprise a material of a conductive elastic material.

In an embodiment of the disclosure, the conductive elastic material is one of a conductive elastic metallic material, and a conductive elastic polymer.

In an embodiment of the disclosure, the electrode plates further comprise a material of one of a dielectric elastomer, a polyelectrolyte, and a piezoelectric polymer.

In an embodiment of the disclosure, the liquid material is one of amino silicone oil, epoxy modified silicone oil, and carboxyl modified silicone oil.

According to another aspect of the exemplary embodiment of the present disclosure, there is provided a display device, comprising: the display panel as above; and a housing, configured to receive the display panel.

BRIEF DESCRIPTION OF THE DRAWINGS

The above and other features and advantages of the present disclosure will become more apparent and a more comprehensive understanding of the present disclosure can be obtained, by describing in detail exemplary embodiments thereof with reference to the accompanying drawings, in which.

DETAILED DESCRIPTION OF EMBODIMENTS OF THE DISCLOSURE

Exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the disclosure in view of attached drawings should not be construed as being limited to the embodiment set forth herein; rather, these embodiments are provided so that the present disclosure will be thorough and complete, and will fully convey the general concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective dimension and shape of each component in the drawings are only intended to exemplarily illustrate the contents of the disclosure, rather than to demonstrate the practical dimension or proportion of components of a display panel for the blind and a display device.

Figure 1:
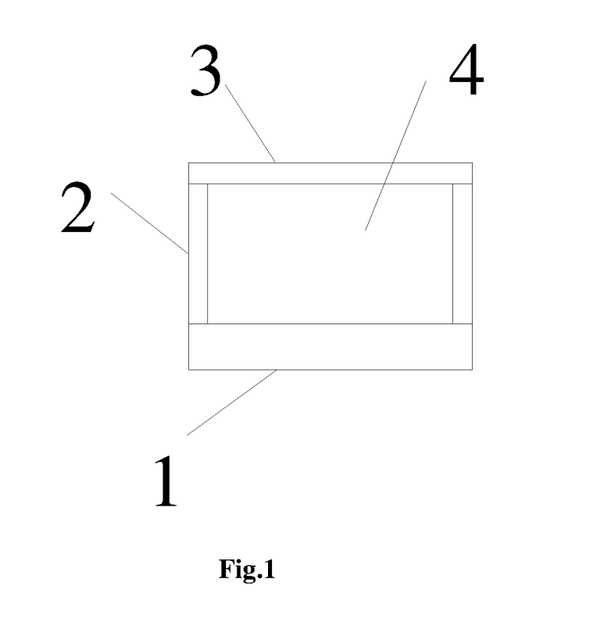
FIG. 1 illustrates a structural schematic view of the display panel for the blind, according to an embodiment of the disclosure, the display panel being not energized.

In an embodiment of the disclosure:

According to a general technical concept of embodiments of the present disclosure, as illustrated in FIG. 1, in a first aspect of the embodiments of the disclosure, there is provided an exemplary display panel for the blind, comprising: a back plate 1 and a plurality of display units arranged in an array on the back plate 1, e.g., in a form of certain shape such as rectangular shape, diamond shape, equilateral polygon shape, or the like, each of the plurality of display units comprising: supports 2 provided on the back plate 1; and an elastic film layer 3 provided on top of the supports 2 and spaced apart from the back plate 1. The back plate 1, and the elastic film layer 3 and the supports 2 of each of the plurality of display units cooperate with one another to define an accommodation cavity 4 thereamong of a respective one display unit of the plurality of display units, and the respective one of the plurality display units is configured to deform in a condition that it is energized so as to drive the accommodation cavity 4 as defined above to change its shape and in turn to squeeze the elastic film layer 3 to project outwards, such that a projection portion is formed at a location of each of the plurality of display units.

In another embodiment of the disclosure,

As illustrated in FIG. 2 and FIG. 6-8, the display panel for the blind, comprises the back plate 1 and the plurality of display units arranged in an array on the back plate 1, e.g., in a form of a certain shape such as rectangular shape, diamond shape, equilateral polygon shape, or the like, each of the plurality of display units comprising: supports 2 provided on the back plate 1; and an elastic film layer 3 provided on top of the supports 2 and spaced apart from the back plate 1. The elastic film layer 3 is for example an elastic membrane formed by a material of polydimethylsiloxane and is fixedly connected at the top of the supports 2 and has its rigidity less than that of the back plate 1. The back plate 1, and the elastic film layer 3 and the supports 2 of each of the plurality of display units cooperate with one another to define collectively the accommodation cavity 4 thereamong of a respective one display unit of the plurality of display units. And the supports 2 for defining each accommodation cavity 4 comprises: a supporting body 21; and at least one pair of positive electrode plate 22 and negative electrode plate 23, the positive and negative electrode plates of each pair of the at least one pair being fixed on respective one of the supporting bodies and located opposite to each other, respectively. For example, the positive electrode plate 22 of each pair of the at least one pair is located on a first inner side of the supporting body 21, and the negative electrode plate 23 of each pair of the at least one pair is located on a second inner side of the supporting body 21 opposite to the first inner side. The supporting bodies may be formed by an elastic insulating material, and configure to connect the back plate 1 and the elastic film layer 3 with each other and secure them together, so as to implement a supporting and fixing effect. Specifically, each of the supporting bodies is in a cylindrical shape with a cross section of round shape, rectangular shape, diamond shape or the like, and is connected fixedly at a top end thereof with the elastic film layer 3 and connected fixedly at a bottom end thereof with the back plate 1. The positive and negative electrode plates comprise a material of an elastic material, typically a conductive elastic material, such as a conductive elastic metallic material, and a conductive elastic polymer, and/or a dielectric elastomer, a polyelectrolyte, or a piezoelectric polymer. Furthermore, the positive and negative electrode plates of each pair of the at least one pair are fixed on inner surfaces of respective supporting bodies and opposite to each other; in other words, the positive and negative electrode plates are secured respectively on side faces of respective supporting bodies opposite to each other, i.e., side faces facing towards each other, inside each of the plurality of display units. For example, the cross section of each supporting body is in a form of rectangular shape. As illustrated in FIG. 1, the positive and negative electrode plates are for example provided respectively on supporting bodies of each of the plurality of display units on both left and right sides thereof; or the positive and negative electrode plates are for example provided respectively on supporting bodies of each of the plurality of display units on both front and rear sides thereof; or alternatively, the positive and negative electrode plates are for example provided respectively on supporting bodies of each of the plurality of display units on both left and rights sides and on both front and rear sides thereof, i.e., on four sides of respective supporting bodies, such that the positive and negative electrode plates may squeeze inwards in four directions (i.e., frontwards, rearwards, leftwards, rightwards) of the accommodation cavity 4 by inward deformation thereof in a condition that the display panel is energized. The electrode plates located adjacent to each other or one another are spaced apart mutually on the supporting bodies, respectively; and adjacent electrode plates on a same supporting body of the supporting bodies may be electrically insulated from each other or one another by the same supporting body. In the embodiment, the electrode plates on the respective supporting bodies are connected fixedly at respective top ends thereof with the elastic film layer 3, and connected fixedly at respective bottom ends thereof with the back plate 1. Or in an alternative embodiment, the electrode plates on the respective supporting bodies are disconnected at respective top ends thereof with the elastic film layer 3 and at respective bottom ends thereof with the back plate 1, i.e., a length of each of the electrode plates in a vertical direction perpendicular to the back plate 1 is provided to be smaller than a length of each supporting body in the vertical direction. As illustrated in FIG. 3, the length of each of the electrode plates in the vertical direction is further provided to be not less than ½ of the length of each supporting body in the vertical direction, such that once the electrode plates are deformed, the supporting bodies at which the electrodes plates are respectively located are driven to change shapes thereof so as to squeeze inwards the accommodation cavity 4.

Figure 2:
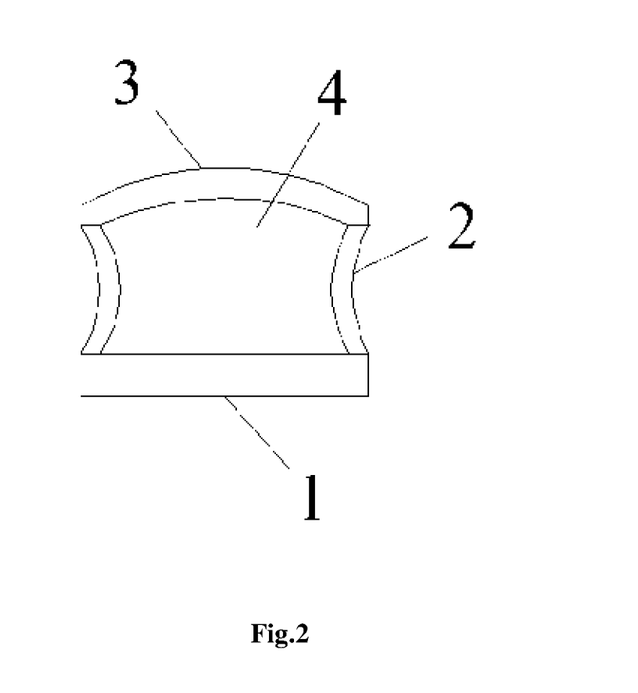
FIG. 2 illustrates a structural schematic view of the display panel for the blind according to an embodiment of the disclosure, the display panel being energized so as to be deformed to project outwards.
Figure 3:
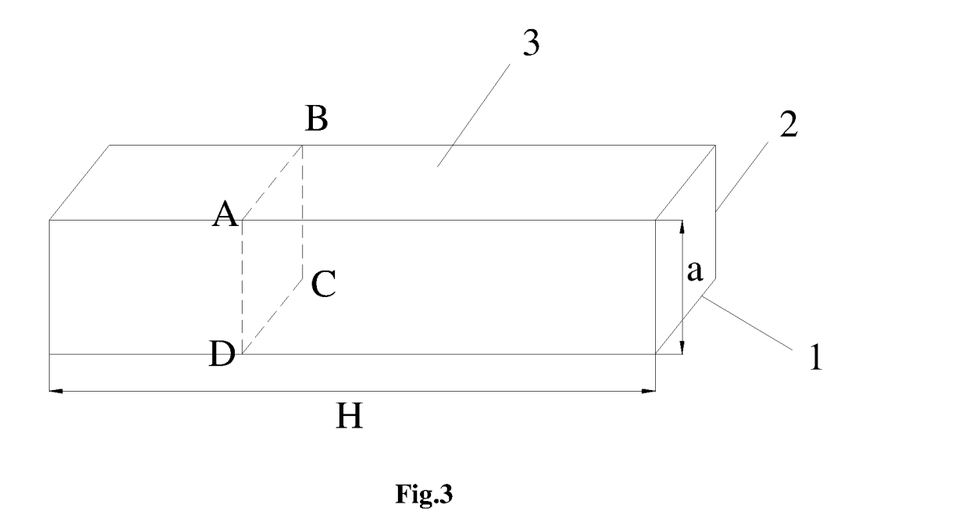
FIG. 3 illustrates a structural schematic view of the display panel for the blind according to an embodiment of the disclosure.

As illustrated in FIG. 2, each of the positive and negative electrode plates is connected with a power supply electrode, the respective power supply electrodes are configured to energize the positive and negative electrode plates respectively, and for example secured onto the back plate 1, the supports 2 or the elastic film layer 3. In an alternative embodiment, the respective power supply electrodes are directly connected with aforementioned positive and negative electrode plates respectively. When the at least one pair of positive and negative electrode plates opposite to each other in a same single display unit are energized by the respective power supply electrodes, the at least one pair of positive and negative electrode plates are attracted towards each other by an effect applied by an electrostatic force therebetween so as to approach towards each other and thus cause respective deformations and in turn deformations of respective supporting bodies at which the positive and negative electrode plates are located respectively. As such, the supporting bodies are squeezed towards the accommodation cavity 4 form outside to inside of the latter. Since the back plate 1 at the bottom of the accommodation cavity 4 is formed by rigid material and thus is not readily deformable, then a squeezing force applied directing to the accommodation cavity 4 may essentially act totally on the elastic film layer 3 at an upper portion of the accommodation cavity 4 such that the elastic film layer projects outwards to form the projection portion at the location of the respective single one of the plurality of display units. When the at least one pair of positive and negative electrode plates opposite to each other in a same single display unit are de-energized from the respective power supply electrodes, the supporting bodies may return under an action of an elastic restoring force, so as to eliminate the squeezing effect inwards the accommodation cavity 4 and in turn to restore a smoothness of a surface of the elastic film layer.

Figure 4:
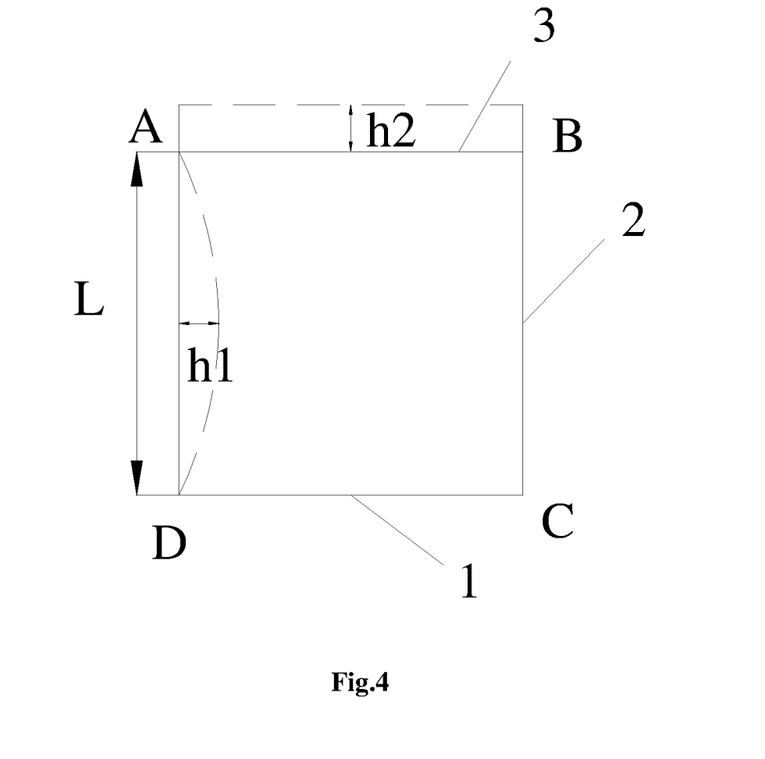
FIG. 4 illustrates a front view of the display panel for the blind as illustrated in FIG. 3, comprising a cross-section labeled by 'ABCD'.

As illustrated in FIG. 3 and FIG. 4, in the embodiment, as labeled therein, the display panel for the blind has a length labeled by 'H', and a cross section labeled by 'ABCD'. For facilitating a calculation, provided that the cross section 'ABCD' is a square with a side length labeled by 'a'. The positive and negative electrode plates are formed by an ion exchange membrane composite material, which may be expressed by a molecular formula as below:

The ion exchange membrane composite material has an amount of deformation over 20% under a voltage of 4~7v, with the positive and negative electrode plates being provided on both left and right sides of the respective supporting body respectively and connected at respective top ends thereof with the elastic film layer 3 and at respective bottom ends thereof with the back plate 1 respectively. When the electrode plates are energized to deform, the supporting bodies at both left and right sides in turn deform. Once the deformations take place, provided that the length of each of the electrode plates is labeled by 'L', and a recession depth of each of the electrode plates is labeled by 'h1'; and for facilitating calculation, provided that H is invariable, then, a variation of an area represents a variation in volume, and a variation in an area of a longitudinal section of the accommodation cavity 4 at respective supporting bodies at both sides may be approximated to be 2*½*h1*L=h1*L. And for facilitating calculation, provided that once the deformations occur, the elastic film layer 3 remains to be planar in surface thereof but projects wholly outwards, i.e., the surface of the elastic film layer 3 is considered to be translated outwards, then a height of the deformation of the elastic film layer 3 is h2=h2*L/2. As such, by way of example, in a condition that a=3 cm, once the deformations take place, L is 3.3 cm, h1 is about 0.3 cm, and then there is a variation in height 'h2' of about 0.5 cm.

In the embodiment, the accommodation cavity 4 is filled with a liquid material or a gas material. In an exemplary embodiment, the liquid material is silicon oil, and more specifically, such as amino silicone oil, epoxy modified silicone oil, or carboxyl modified silicone oil. In an exemplary embodiment, the gas material is a gaseous material; and more specifically, air or inert gas. Therefore, once the accommodation cavity 4 deforms, e.g., the squeezing force is delivered to the elastic film layer 3 via the liquid material or the gas material contained therein, such that the elastic film layer 3 may form the projection portion more readily under the action of the squeezing force.

Figure 6:
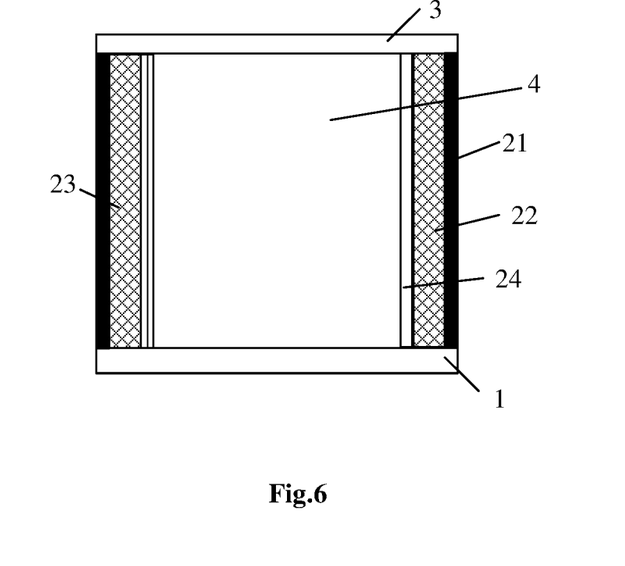
FIG. 6 illustrates a cross-sectional view of a display panel for the blind, according to an embodiment of the disclosure, the display panel being not energized.

In the embodiment, an outer surface of each electrode plate is, for example, covered with a dielectric layer 24, as shown in FIG. 6, which dielectric layer is configured to insulate the respective electrode plate from ambient environment, so as to prevent the electrode plate from short circuiting and in turn any damage to respective display unit.

Figure 7:
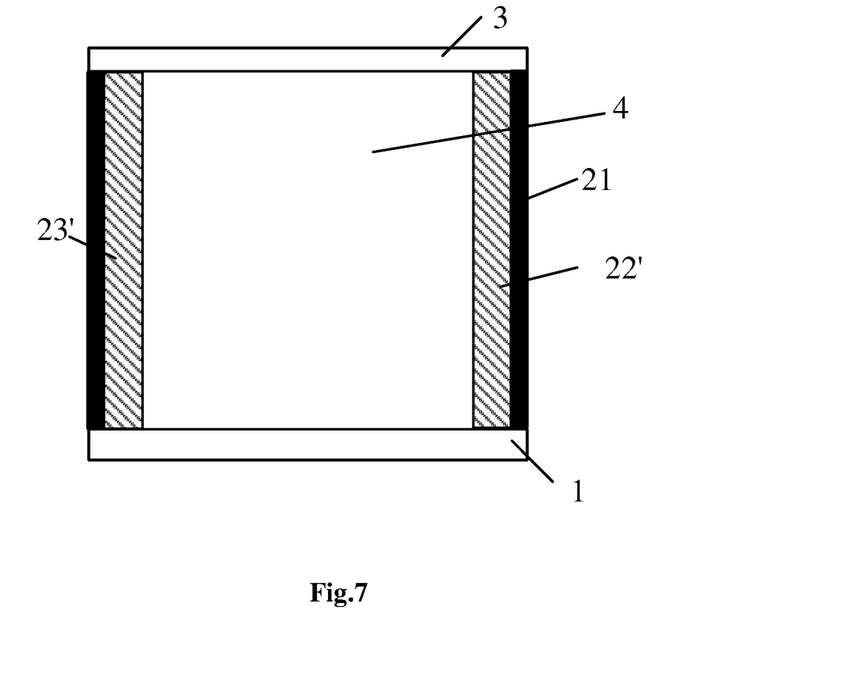
FIG. 7 illustrates a cross-sectional view of a display panel tor the blind, according to an embodiment of the disclosure, the display panel being not energized.
Figure 8:
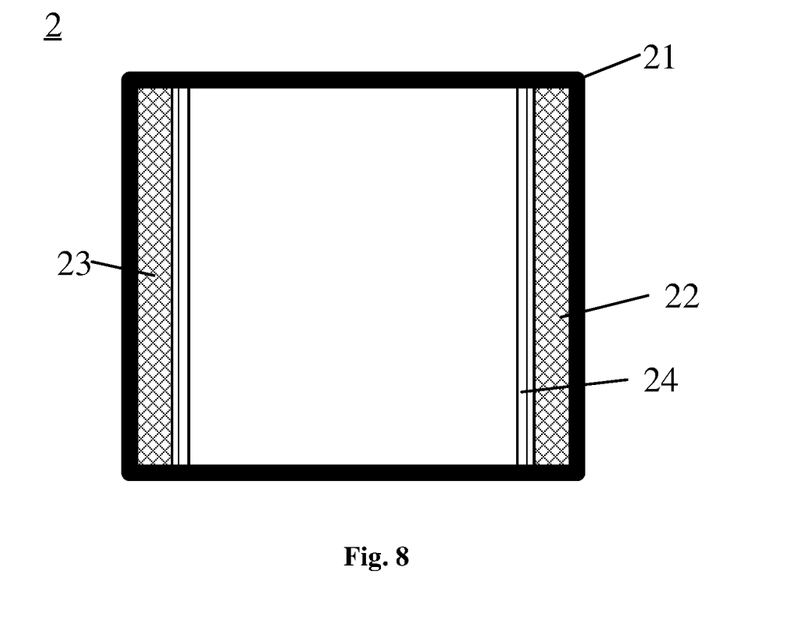
FIG. 8 illustrates a top view of a support according to an embodiment of the disclosure.

In another embodiment of the disclosure:

This embodiment differs from aforementioned embodiment based on the at least one pair of positive and negative electrode plates, lying in that: the supports comprise: respective supporting bodies; and at least one pair of electromagnet pieces of opposite magnetic polarities (i.e., in each pair, one of the electromagnet pieces has a N magnetic polarity, shown as 22' in FIG. 7, and the other one of the electromagnet pieces has a S magnetic polarity, shown as 23' in FIG. 7) provided on a same supporting body of the supporting bodies, rather than at least one pair of positive and negative electrode plates as above, the at least one pair of electromagnet pieces of opposite magnetic polarities are electrically connected at respective bottom ends with the back plate, and are connected fixedly at respective top ends with the elastic film layer. When the at least one pair of electromagnet pieces of opposite magnetic polarities provided on a same supporting body of the supporting bodies are energized by the respective power supply electrodes, the at least one pair of electromagnet pieces of opposite magnetic polarities are attracted towards each other by an effect applied by a magnetic force therebetween (rather than an effect applied by an electrostatic force therebetween as in above embodiment which is provided by the at least one pair of energized positive and negative electrode plates) and thus deform respectively, so as to squeeze the accommodation cavity and to project the elastic film layer outwards to form a projection portion.

In still another embodiment:

This embodiment differs from aforementioned embodiment based on the at least one pair of electromagnet pieces of opposite magnetic polarities, lying in that: the elastic film layer and the back plate are provided respectively with electrode plates of a same electric polarity (positive electric polarity or negative electric polarity), or alternatively the elastic film layer and the back plate are provided respectively with electromagnet pieces of a same magnetic polarity (N magnetic polarity or S magnetic polarity).

By way of example, the elastic film layer and the back plate are provided respectively with positive electrode plates, or alternatively the elastic film layer and the back plate are provided respectively with electromagnet pieces of a first magnetic polarity (one of N magnetic polarity and S magnetic polarity), the positive electrode plats (or the electromagnet pieces of the first magnetic polarity) being connected with respective power supply electrodes, respectively. Or otherwise, in another alternative embodiment, the elastic film layer and the back plate are provided respectively with negative electrode plates, or alternatively the elastic film layer and the back plate are provided respectively with electromagnet pieces of a second magnetic polarity (i.e., the other one of N magnetic polarity and S magnetic polarity) opposite to the first magnetic polarity, the negative electrode plates (or the electromagnet pieces of the second magnetic polarity) being connected with respective power supply electrodes, respectively. In a more specific embodiment, e.g., the elastic film layer is provided with a first positive electrode plate and the back plate is provided with a second positive electrode plate opposite to the first positive electrode plate, and when the first positive electrode plate and the second positive electrode plate are energized respectively by respective power supply electrodes, the first positive electrode plate and the second positive electrode plate repel each other under an action of an electrostatic force applied therebetween; and since a rigidity of the back plate is larger than a rigidity of the elastic film layer, then the elastic film layer projects outwards so as to form a projection portion, which may be touched by the blind such that a combination of projection portions on the display panel may be read out to form language for the blind.

Figure 5:
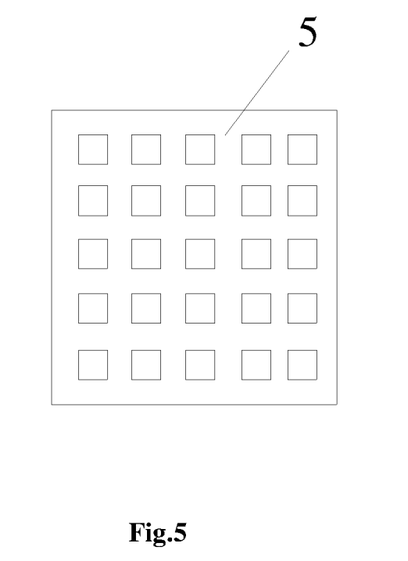
FIG. 5 illustrates a structural schematic view of a display device according to an embodiment of the disclosure.

In yet another embodiment:

There is provided a display device, as illustrated in FIG. 5, comprising: the display panel 5 for the blind as mentioned in above embodiments; and housing configured to receive the display panel. The back plate in the display panel 5 is provided with power supply electrodes. When the plurality of display units are energized by the power supply electrodes, the elastic film layer of each of the plurality of display units projects outwards so as to form respective projection portion. The plurality of projection portions may combine with one another to form text or image, which may be touched and thus read out by the blind so as to implement a purpose of reading out the display device by touch of the blind.

As compared with relevant art, some beneficial effects are provided by embodiments of the disclosure, as follows:

1. As to the display panel for the blind provided in the embodiments of the disclosure, when it is driven by electric power, the plurality of elastic film layers provided thereon may project outwards so as to form respective projection portions, several projection portions being combined with one another so as to form the language expression for the blind, i.e., so as to implement a purpose of reading out the display device by touch of the blind.

2. As to the display panel for the blind provided in the embodiments of the disclosure, once the supports are energized by power supply electrodes in the display panel, the electrode plate or electromagnet pieces opposite to each other on the supports may attract mutually under the action of the electrostatic force or the magnetic force so as to approach towards each other and to drive the supports to approach mutually, such that the supports squeeze inwards the accommodation cavity and the liquid material or the gas material contained within the accommodation cavity in turn deform, and then the elastic film layers project outwards to form projection portions respectively, which projection portions may be touched and thus read out by the blind so as to implement a purpose of reading out the display device by touch of the blind.

3. In other embodiments of the disclosure, the elastic film layer and the back plate are provided with positive electrode plates or electromagnet pieces of a first magnetic polarity, or provided with negative electrode plates or electromagnet pieces of a second magnetic polarity opposite to the first magnetic polarity. Once the electrode plates (or the electromagnet pieces) provided on the respective elastic film layer and the back plate are energized by the respective power supply electrodes in the display panel, the electrode plates (or the electromagnet pieces) repel each other under an action of an electrostatic force (or an electromagnetic force) applied therebetween; and since a rigidity of the back plate is larger than a rigidity of the elastic film layer, then the elastic film layer projects outwards so as to form a projection portion, which may be touched by the blind such that a combination of projection portions on the display panel may be read out to form language for the blind.

4. In embodiments of the disclosure, the outer surfaces of the electrode plates are for example plated additionally with a dielectric layer, which dielectric layer is configured to insulate the respective electrode plate from ambient environment, so as to prevent the electrode plate from short circuiting.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although the disclosure is described in view of the attached drawings, the embodiments disclosed in the drawings are only intended to illustrate the preferable embodiment of the present disclosure exemplarily, and should not be deemed as a restriction thereof.

Although several exemplary embodiments of the general concept of the present disclosure have been shown and described, it would be appreciated by those skilled in the art that various changes or modifications may be made in these embodiments without departing from the principles and spirit of the disclosure and lie within the scope of present application, which scope is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A display panel for the blind, comprising:
a back plate; and
a plurality of display units provided on the back plate, each comprising:
a support provided on the back plate; and
an elastic film layer provided on top of the support and spaced apart from the back plate,
wherein the elastic film layer, the support and the back plate cooperate with one another to define an accommodation cavity thereamong of a respective one of the plurality of display units, and the respective one of the plurality display units is configured to deform in a condition that the respective one of the plurality display units is energized so as to drive the accommodation cavity to change the shape of the respective one of the plurality of display units and in turn to squeeze the elastic film layer to project outwards,
wherein the accommodation cavity is filled with a liquid material, and the liquid material is one of amino silicone oil, epoxy modified silicone oil, and carboxyl modified silicone oil.

2. The display panel according to claim 1, wherein the support comprises:
a supporting body; and
at least one pair of positive and negative electrode plates, one of the positive and negative electrode plates of each pair of the at least one pair being located on a first inner side of the supporting body and the other of the positive and negative electrode plates of each pair of the at least one pair being located on a second inner side of the supporting body opposite to the first inner side, and each of the positive and negative electrode plates of each pair of the at least one pair being connected with a power supply electrode.

3. The display panel according to claim 1, wherein the support comprises:
a supporting body; and
at least one pair of electromagnet pieces of opposite N and S magnetic polarities, one of the electromagnet pieces of opposite N and S magnetic polarities of each pair of the at least one pair being located on a first inner side of the supporting body and the other of the electromagnet pieces of opposite N and S magnetic polarities of each pair of the at least one pair being located on a second inner side of the supporting body opposite to the first inner side, and each the electromagnet pieces of opposite N and S magnetic polarities being connected with a power supply electrode.

4. The display panel according to claim 1, wherein electrode plates of an identical electrical polarity are provided respectively on both the elastic film layer and the back plate, the identical electrical polarity being one of positive electric polarity and negative electrical polarity, and each of the electrode plates being connected with a power supply electrode.

5. The display panel according to claim 1, wherein electromagnet pieces of an identical magnetic polarity are provided respectively on both the elastic film layer and the back plate, the identical magnetic polarity being one of N magnetic polarity and S magnetic polarity, and each of the electromagnet pieces being connected with a power supply electrode.

6. The display panel according to claim 2, wherein an outer surface of the at least one pair of positive and negative electrode plates is covered with a dielectric layer.

7. The display panel according to claim 1, wherein the elastic film layer is an elastic membrane formed by a material of polydimethylsiloxane.

8. The display panel according to claim 1, wherein the elastic film layer is an elastic membrane formed by a material of polydimethylsiloxane.

9. The display panel according to claim 2, wherein the elastic film layer is an elastic membrane formed by a material of polydimethylsiloxane.

10. The display panel according to claim 3, wherein the elastic film layer is an elastic membrane formed by a material of polydimethylsiloxane.

11. The display panel according to claim 4, wherein the elastic film layer is an elastic membrane formed by a material of polydimethylsiloxane.

12. The display panel according to claim 5, wherein the elastic film layer is an elastic membrane formed by a material of polydimethylsiloxane.

13. The display panel according to claim 6, wherein the elastic film layer is an elastic membrane formed by a material of polydimethylsiloxane.

14. The display panel according to claim 2, wherein the electrode plates comprise a material of a conductive elastic material.

15. The display panel according to claim 14, wherein the conductive elastic material is one of a conductive elastic metallic material, and a conductive elastic polymer.

16. The display panel according to claim 14, wherein the electrode plates further comprise a material of one of a dielectric elastomer, a polyelectrolyte, and a piezoelectric polymer.

17. A display device, comprising:
the display panel according to claim 1; and
a housing, configured to receive the display panel.

* * * * *